United States Patent [19]
Dinkel et al.

[11] Patent Number: 5,810,315
[45] Date of Patent: Sep. 22, 1998

[54] ADJUSTMENT DEVICE FOR THE LONGITUDINAL ADJUSTMENT OF A VEHICLE SEAT

[75] Inventors: Emil Dinkel, Renningen; Josef Klink, Nagold, both of Germany

[73] Assignee: Mercedes-Benz AG, Stuttgart, Germany

[21] Appl. No.: 796,035

[22] Filed: Feb. 5, 1997

[30] Foreign Application Priority Data

Feb. 5, 1996 [DE] Germany .................. 196 03 945.2

[51] Int. Cl.⁶ .................................................. F16M 13/00
[52] U.S. Cl. .................................... 248/424; 296/65.1
[58] Field of Search .......................... 297/330; 248/424, 248/429, 430, 422; 296/65.1

[56] References Cited

U.S. PATENT DOCUMENTS

| 4,605,192 | 8/1986 | Klüting et al. . | |
| 4,641,806 | 2/1987 | Pipon et al. | 248/430 |
| 5,207,473 | 5/1993 | Nawa et al. | 296/65.1 |

FOREIGN PATENT DOCUMENTS

| 2004504 | 8/1971 | Germany . |
| 4316022 A1 | 11/1994 | Germany . |
| 2193630 | 2/1988 | United Kingdom . |

OTHER PUBLICATIONS

Search Report, Dec. 26, 1997, France.
Search Report, Apr. 16, 1997, Great Britian.

*Primary Examiner*—Ramon O. Ramirez
*Attorney, Agent, or Firm*—Evenson, McKeown, Edwards & Lenahan, P.L.L.C.

[57] ABSTRACT

An adjustment device for the longitudinal adjustment of a vehicle seat is provided which has two rails which are guided displaceably in the longitudinal direction and of which the bottom rail can be secured non-displaceably and the top rail can be connected to the seat and can be displaced therewith. Also provided is a gear mechanism whose housing is connected to, and can be displaced with, the top rail in the longitudinal direction and penetrates through the top rail into the bottom rail and contains a rotary worm which is in engagement with at least one row of teeth of the bottom rail. The housing of the gear mechanism is isolated from the top rail and, at the base, is seated on the underside of an inner rail position, where the housing part of the gear mechanism is guided on associated longitudinal-guidance surfaces of the first rail.

18 Claims, 2 Drawing Sheets

ADJUSTMENT DEVICE FOR THE LONGITUDINAL ADJUSTMENT OF A VEHICLE SEAT

BACKGROUND AND SUMMARY OF THE INVENTION

The invention relates to an adjustment device for the longitudinal adjustment of a seat, in particular for vehicles, having two rails guidably movable with respect to one another by a gear mechanism, one rail being fixed to a seat and the other rail being fixed to the vehicle structure.

In the case of a known adjustment device of this type, the housing of the gear mechanism is connected to the second rail, in particular the top rail, fixedly on all sides. This occasionally gives rise to aggravating noise and a certain sluggishness of the gear mechanism and of the adjustment device as a whole. This noise and sluggishness are caused in the known adjustment device by fluctuations in center-to-center distance and a vertical offset between the two rails, in particular when set right to the front or right to the back. This has a strong influence on the gear mechanism. Also influencing the gear mechanism are deformations of the rails due to installation or warping of the profiles.

In the case of another known adjustment device (German Offenlegungsschrift 20 04 504), the gear mechanism is located outside a pair of rails, this pair comprising two interengaging rails. The first rail is received in a considerably wider, additional rail, and is fastened thereon, said additional rail having, laterally alongside the pair of rails, a row of slots into which a manually rotatable worm can engage for the purpose of the longitudinal adjustment. The worm is mounted rotatably in a special arm extending parallel to the pair of rails. In the case of this configuration the gear-mechanism forces do not act on both rails of the pair of rails during the longitudinal adjustment. The principle of an adjustment device in which a worm is in engagement with a rack is known from DE 43 16 022 A1, the intention being for only a small amount of noise to be produced by the gear mechanism on account of a special configuration of the worm and of the mating toothing.

An object of the invention is to provide an adjustment device for the type mentioned above which results in any adjustment noise being eliminated and in greater smoothness of the gear mechanism.

This object is achieved according to the invention by providing an arrangement wherein the housing of the gear mechanism is only in carry-along contact in the longitudinal direction with the second rail and is otherwise isolated from the second rail, play being produced in the process, and wherein a housing part of the gear mechanism passes through a through-passage of the second rail and is in carry-along contact in the longitudinal direction with associated surfaces of the second rail, in particular of the through-passage, and, at right angles to the longitudinal direction, is arranged with play at a distance from associated surfaces of the through-passage. Isolation of the housing of the gear mechanism from the second rail, in particular the top rail, minimizes fluctuations in center-to-center distance and any vertical offset between the two rails, such changes in center-to-center distance or a vertical offset no longer influencing the gear mechanism. In addition, the gear mechanism is not adversely affected by any deformations of the rails during installation or any warping of the rail profiles. Pressure-angle changes likewise do not have any influence on the gear mechanism. Such an adjustment device eliminates the formation of noise during adjustment and achieves greater smoothness for the adjustment of the gear mechanism.

Other objects, advantages and novel features of the present invention will become apparent from the following detailed description of the invention when considered in conjunction with the accompanying drawings.

DETAILED DESCRIPTION OF THE DRAWINGS

Figure 1:
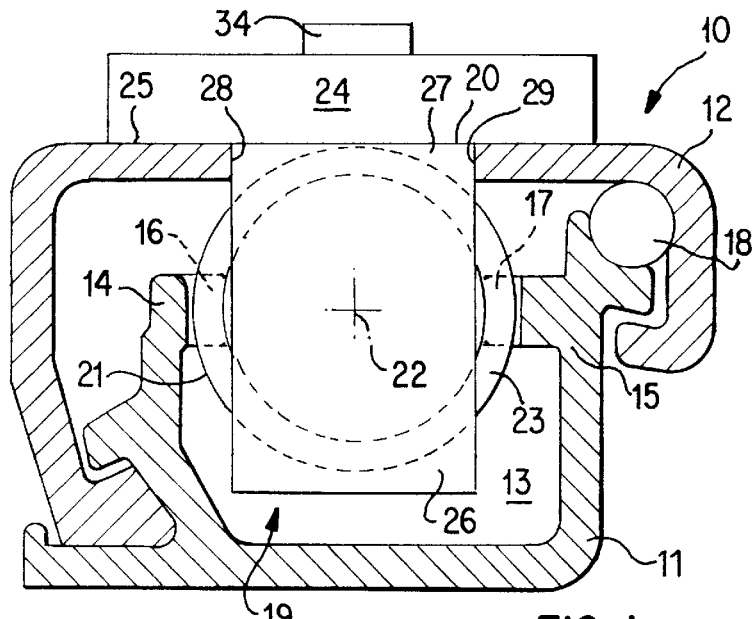
FIG. 1 shows a schematic, partially sectional, side view of a vehicle seat adjustment device in accordance with the prior art.
Figure 2:
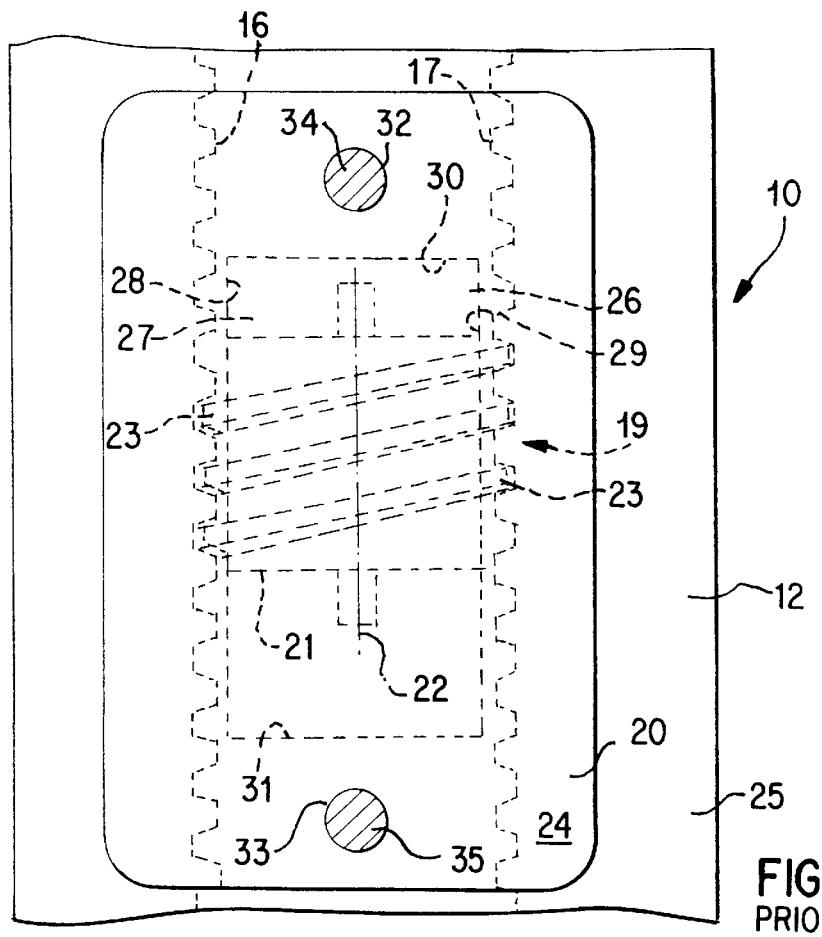
FIG. 2 shows a schematic plan view of part of the adjustment device in FIG. 1.
Figure 3:
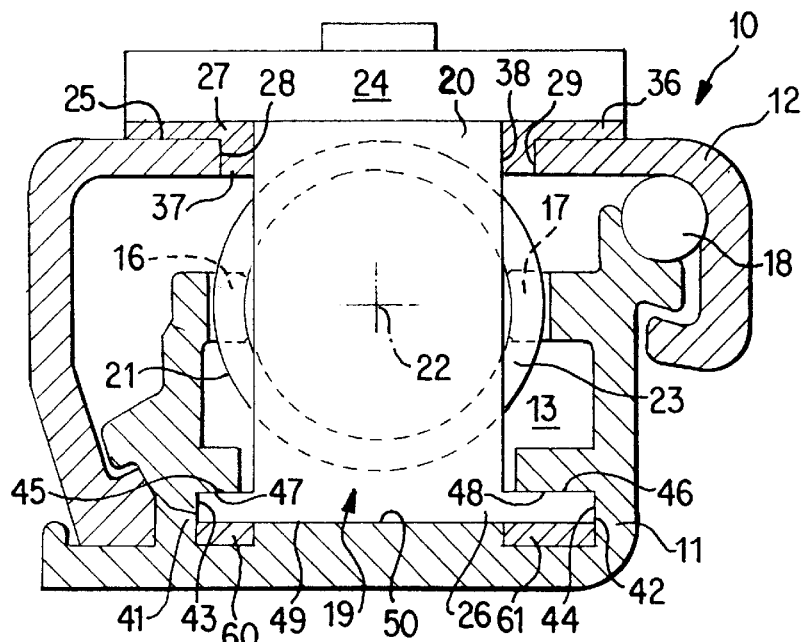
FIG. 3 shows a schematic, partially sectional, side view of an adjustment device, constructed in accordance with a preferred embodiment of the invention.
Figure 4:
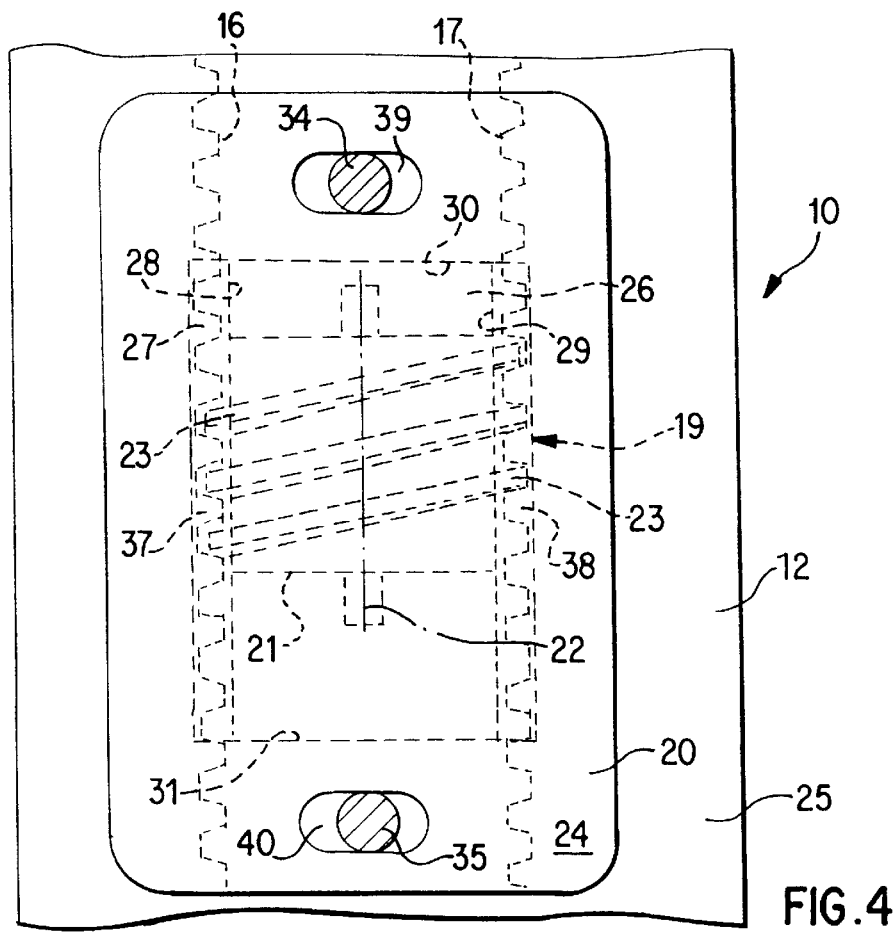
FIG. 4 shows a schematic plan view of part of the adjustment device in FIG. 3.

In order to elucidate the invention, which is shown in FIGS. 3 and 4, first of all a known adjustment device 10 for the longitudinal adjustment of a seat (not shown specifically), in particular for vehicles, is shown in FIGS. 1 and 2. The adjustment device 10 has two rails 11 and 12 which are guided such that they can be displaced relative to one another in the longitudinal direction and of which the first rail 11, in particular the bottom rail, can be secured non-displaceably, e.g. on the vehicle. The second rail 12, in particular the top rail located above said first rail, can be connected to the seat (not shown specifically) and, on actuation for the purpose of the longitudinal adjustment of the seat, can be displaced longitudinally, together with the seat, relative to the first rail 11.

The first rail 11 has an approximately U-shaped profile, an inner space 13 being provided within the first rail 11. In each case one row of teeth 16 or 17, e.g. a respective rack profile, is provided on the inner side of the two legs 14 and 15, respectively, of the first rail 11. The two rails 11 and 12 are connected in captive fashion at right angles to the longitudinal direction, it being possible for rolling bodies 18, e.g. balls, to be provided at a suitable location between the two rails 11, 12.

Furthermore, the adjustment device 10 has a gear mechanism 19 which is intended for the longitudinal adjustment and whose housing 20 is connected to, and can be displaced together with, the second rail 12, in particular the top rail, and penetrates downwards through the second rail 12 into the first rail 11, and into the inner space 13 thereof. The housing 20 contains a rotary worm 21, the longitudinal center axis 22 of which runs essentially in the longitudinal direction. The worm 21, is in engagement, by way of its circumferential ribs 23, with the rows of teeth 16 and 17 on both sides of the first rail 11. Rotary actuation of the worm 21 about the longitudinal center axis 22 in one direction of rotation thus results in the worm 21 moving forwards along the rows of teeth 16, 17 of the first rail 11. Since the housing 20 of the gear mechanism 19 is connected to the second rail 12, in particular the top rail, at least in the longitudinal direction, which is predetermined, for example, by the longitudinal center axis 22, this forward movement thus results in a longitudinal displacement of the second rail 12 relative to the first rail 11. Rotary actuation of the worm 21 in the opposite direction results in a longitudinal displacement of the second rail 12 in the opposite direction.

In the case of this known adjustment device according to FIGS. 1 and 2, the top of the housing 20 of the gear mechanism 19 is in contact, in the longitudinal direction and in the transverse direction, with the second rail 12, in particular the top rail. Consequently, the top housing part 24 rests closely and firmly on the upper side 25 of the second rail 12. The housing part 26, in which the worm 21 is mounted and which passes through the second rail 12 and projects into the inner space 13 of the first rail 11, passes through a, for example, approximately rectangular through-passage 27 of the second rail 12, the housing part 26 fitting precisely into the through-passage 27 and being in contact with the longitudinal sides 28, 29 thereof and with the transverse sides 30, 31 thereof. For fastening the housing 20 on the second rail 12, the latter has, for example, threaded bores 32, 33 which receive in each case one screw 34 or 35, respectively; which secures the housing 20 to its top housing part 24 so as to be firmly in contact with the second rail 12. The respective screw 34 or 35 passes through an appropriately designed hole in the housing 20.

It has been demonstrated that such an adjustment device 10 of the known type according to FIGS. 1 and 2 has certain disadvantages. For example, it occasionally gives rise to aggravating noise, and sluggishness of the gear mechanism 19 is also evident from time to time.

These disadvantages are eliminated in the case of the inventive adjustment device in FIGS. 3 and 4. In the following explanation of the invention with reference to FIGS. 3 and 4, the same reference numerals as in FIGS. 1 and 2 are used as far as possible.

In the case of the adjustment device 10 according to the invention, the housing 20 of the gear mechanism 19 is isolated from the second rail 12, in particular the top rail. This isolation is such that—with the exception of a carry-along contact in the longitudinal direction corresponding to the longitudinal center axis 22—there is play, rather than contact, between the housing 20 and the second rail 12.

The top housing part 24 of the gear mechanism 19 is arranged with play at a distance from the upper side 25 of the second rail 12. The resulting play between the top housing part 24 and the upper side 25 is illustrated in FIG. 3 by the interspace 36 therebetween, it being possible for said interspace to be filled by a damping element.

The housing part 26, which passes through the through-passage 27 of the second rail 12, is in carry-along contact only in the longitudinal direction with associated surfaces, in particular with the transverse sides 30 and 31, of the second rail 12, in particular of the through-passage 27 thereof, whereas, at right angles to the longitudinal direction corresponding to the longitudinal center axis 22, said housing part 26 is arranged with play at a distance from associated surfaces, in particular the longitudinal sides 28 and 29, of the second rail 12, in particular of the through-passage 27. The resulting play on both sides in the transverse direction is indicated in FIGS. 3 and 4 by the interspaces 37 and 38 on both sides, it being possible for each of these interspaces to be filled by damping elements.

The housing 20 of the gear mechanism 19 has, in the top housing part 24, slots 39 and 40 which run at right angles to the longitudinal direction, e.g. to the longitudinal center axis 22. The slots 39, 40 have bolts, e.g. the screws 34, 35, which serve for connecting the housing 20 to the second rail 12, and act on the second rail 12, passing through them, it being possible for the remaining interspace to be filled by damping elements in each case.

The housing 20 of the gear mechanism 19 is guided, by way of the housing part 26 penetrating into the first rail 11, to be precise into the inner space 13 thereof, approximately at the base on associated guidance surfaces of the first rail 11. All of these guidance surfaces are interacting longitudinal-guidance surfaces.

The housing part 26 is thus provided, approximately at the base, on the two outer sides with approximately vertically running longitudinal-guidance surfaces 41 and 42, which are assigned approximately vertically running inner longitudinal-guidance surfaces 43 and 44, respectively of the first rail 11.

The housing part 26 is further provided, at the base, on both sides with approximately horizontally running upper longitudinal-guidance surfaces 45, 46. The first rail 11 has associated, horizontal longitudinal-guidance surfaces 47 and 48 respectively, which are provided on the inside, on both sides, and grip over the longitudinal-guidance surfaces 45 and 46, respectively, on the housing part 26.

Furthermore, at least one horizontally running lower longitudinal-guidance surface 49 is provided approximately at the base of the housing part 26, and it is assigned at least one approximately horizontal and upper longitudinal-guidance surface 50 which is arranged on the inside of the first rail 11 and over which the longitudinal-guidance surface 49 of the housing part 26 grips.

The above-explained, interacting longitudinal-guidance surfaces 41 to 50 approximately at the base of the housing part 26 and in the interior 13 of the first rail 11 effect guided alignment of the housing part 26 and thus of the entire housing 20 of the gear mechanism 19, at right angles to the longitudinal direction, to the left and right and, furthermore, to the top and bottom. The gear mechanism is guided relatively closely between said longitudinal-guidance surfaces 41 to 50. These measures minimize fluctuations in center-to-center distance and a vertical offset between the rails 11 and 12. The gear mechanism 19 is thus no longer adversely affected by a vertical offset or by changes in center-to-center distance when the rails 11, 12 have been set right to the front or right to the back following longitudinal adjustment relative to one another. It is also advantageous that any deformations between the rails 11 and 12 during installation or any warping of the rail profiles likewise have no adverse effect on the gear mechanism 19. In addition, any pressure-angle changes no longer influence the gear mechanism 19. Any aggravating noise is thus avoided, and improved smoothness of the adjustment device is achieved.

The respective damping elements 37, 38, 60 and 61 shown in FIG. 3 may consist of soft, elastically deformable material.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. Adjustment device for the longitudinal adjustment of a seat, in particular for vehicles, having a first bottom rail and a second top rail which are guided such that they can be displaced relative to one another in the longitudinal direction, said first rail being non-displaceable and the second rail being displaceable longitudinally, a gear mechanism being provided having a housing connected to and displaceable with the second rail in the longitudinal direction and penetrating through the second rail into the first rail and containing a rotary worm which is in engagement with at least one row of teeth of the first rail, wherein the housing of the gear mechanism is only in carry-along contact in the longitudinal direction with the second rail and is otherwise isolated from the second rail, play being produced in the process, and wherein a housing part of the gear mechanism passes through a through-passage of the second rail and is in carry-along contact in the longitudinal direction with associated surfaces of the second rail, in particular of the through-passage, and, at right angles to the longitudinal direction, is arranged with play at a distance from associated surfaces of the through-passage.

2. Adjustment device according to claim 1, wherein a top housing part of the gear mechanism is arranged with play at a distance from an upper side of the second rail.

3. Adjustment device according to claim 2, wherein the housing of the gear mechanism has slots which extend at right angles to the longitudinal direction, and comprising threaded members passing through the slots which serve for connecting the housing to the second rail.

4. Adjustment device according to claim 2, wherein the housing of the gear mechanism is guided by way of the housing part penetrating into the first rail, approximately at a base of the housing part on associated guidance surfaces of the first rail.

5. Adjustment device according to claim 1, wherein the housing of the gear mechanism has slots which extend at right angles to the longitudinal direction, and comprising threaded members passing through the slots which serve for connecting the housing to the second rail.

6. Adjustment device according to claim 5, wherein the housing of the gear mechanism is guided by way of the housing part penetrating into the first rail, approximately at a base of the housing part on associated guidance surfaces of the first rail.

7. Adjustment device according to claim 1, wherein the housing of the gear mechanism is guided by way of the housing part penetrating into the first rail, approximately at a base of the housing part on associated guidance surfaces of the first rail.

8. Adjustment device according to claim 7, wherein the housing part has longitudinal-guidance surfaces approximately at a base thereof which interact with associated longitudinal-guidance surfaces of the first rail for the purpose of longitudinal guidance.

9. Adjustment device according to claim 8, wherein approximately vertically extending outer longitudinal-guidance surfaces of the housing part are provided which in use engage approximately vertically extending inner longitudinal-guidance surfaces of the first rail.

10. Adjustment device according to claim 9, wherein the interacting longitudinal-guidance surfaces approximately at the base of the housing part and in the interior of the first rail effect guided alignment of the housing part, at right angles to the longitudinal direction, on both sides and to the top and bottom.

11. Adjustment device according to claim 8, wherein approximately horizontally extending upper longitudinal-guidance surfaces which are provided approximately at the base of the housing part are provided which in use engage approximately horizontal longitudinal-guidance surfaces which are provided on the inside of the first rail and grip over the longitudinal-guidance surfaces on the housing part.

12. Adjustment device according to claim 11, wherein the interacting longitudinal-guidance surfaces approximately at the base of the housing part and in the interior of the first rail effect guided alignment of the housing part, at right angles to the longitudinal direction, on both sides and to the top and bottom.

13. Adjustment device according to claim 8, wherein at least one approximately horizontally extending lower longitudinal-guidance surface which is provided approximately at the base of the housing part is provided which in use engages an approximately horizontal longitudinal-guidance surface which is provided on the inside of the first rail and over which the longitudinal-guidance surface of the housing part grips.

14. Adjustment device according to claim 13, wherein the interacting longitudinal-guidance surfaces approximately at the base of the housing part and in the interior of the first rail effect guided alignment of the housing part, at right angles to the longitudinal direction, on both sides and to the top and bottom.

15. Adjustment device according to claim 8, wherein the interacting longitudinal-guidance surfaces approximately at the base of the housing part and in the interior of the first rail effect guided alignment of the housing part, at right angles to the longitudinal direction, on both sides and to the top and bottom.

16. Vehicle seat adjustment assembly comprising:

a top rail adapted to carry a vehicle seat, a bottom rail fixedly attachable to a vehicle support structure, said top rail being supported at said bottom rail while accommodating longitudinal adjustment movements of said top rail with respect to said bottom rail, gear teeth carried by a first of said rails, and a gear mechanism carried by a second of said rails and including seat adjustment gear teeth engageable in use with the gear teeth of the first rail, said gear mechanism including a gear housing which in use is in guiding contact in the longitudinal direction with the second rail while being otherwise isolated from the second rail by lateral play spaces formed between said housing and said second rail.

17. Vehicle seat adjustment assembly according to claim 16, wherein said second of said rails is said top rail, wherein said housing protrudes downwardly through an opening in said top rail with lateral play spaces between side walls of said opening and said housing.

18. Vehicle seat adjustment assembly according to claim 17, wherein a bottom part of said housing is guided along downwardly facing guide surfaces of said bottom rail.

* * * * *